(12) United States Patent
Hetherington et al.

(10) Patent No.: US 9,189,153 B2
(45) Date of Patent: Nov. 17, 2015

(54) VIDEO PHONE SYSTEM

(71) Applicant: 2236008 Ontario Inc., Waterloo (CA)

(72) Inventors: Phillip A. Hetherington, Port Moody (CA); Mario Vaira, Vancouver (CA); Alex Escott, Vancouver (CA)

(73) Assignee: 2236008 Ontario Inc., Waterloo, Ontario (CA)

( * ) Notice: Subject to any disclaimer, the term of this patent is extended or adjusted under 35 U.S.C. 154(b) by 0 days.

(21) Appl. No.: 14/286,322

(22) Filed: May 23, 2014

(65) Prior Publication Data

US 2014/0258868 A1 Sep. 11, 2014

Related U.S. Application Data

(60) Division of application No. 13/464,222, filed on May 4, 2012, now Pat. No. 8,743,173, which is a continuation of application No. 12/186,264, filed on Aug. 5, 2008, now Pat. No. 8,194,117.

(60) Provisional application No. 60/964,088, filed on Aug. 8, 2007.

(51) Int. Cl.
*H04N 7/14* (2006.01)
*G06F 3/0488* (2013.01)
*H04N 7/15* (2006.01)
*H04L 29/06* (2006.01)

(52) U.S. Cl.
CPC .......... *G06F 3/04883* (2013.01); *H04L 65/403* (2013.01); *H04N 7/14* (2013.01); *H04N 7/142* (2013.01); *H04N 7/15* (2013.01); *H04L 65/605* (2013.01)

(58) Field of Classification Search
CPC ....... H04N 7/15; H04N 7/142; H04N 65/403; H04N 65/605; G06F 3/0488; G06F 3/04883
See application file for complete search history.

(56) References Cited

U.S. PATENT DOCUMENTS

| 6,163,335 A | 12/2000 | Barraclough |
| 2003/0012209 A1 | 1/2003 | Abdelilah et al. |
| 2003/0189943 A1 | 10/2003 | Gorti et al. |
| 2005/0021621 A1 | 1/2005 | Welch et al. |
| 2007/0268362 A1 | 11/2007 | West et al. |
| 2008/0168361 A1* | 7/2008 | Forstall et al. ................ 715/753 |
| 2008/0184115 A1* | 7/2008 | Back et al. ..................... 715/702 |

FOREIGN PATENT DOCUMENTS

| WO | WO 02/052869 A2 | 7/2002 |
| WO | WO 2004/084006 A2 | 9/2004 |

* cited by examiner

*Primary Examiner* — Tuan D Nguyen
(74) *Attorney, Agent, or Firm* — Brinks Gilson & Lione

(57) ABSTRACT

A system allocates channel bandwidth based on the data received from a plurality of remote sources. A de-multiplexer/priority circuit separates two or more different data streams into their components parts. A stream modification driver modifies one or more characteristics of the data received from the de-multiplexer/priority circuit based on a priority assigned to the data by the de-multiplexer/priority circuit. The de-multiplexer/priority circuit determines the data transfer rates for each of the different data streams based on the assigned priority.

12 Claims, 14 Drawing Sheets

VIDEO PHONE SYSTEM

PRIORITY CLAIM

This application is a divisional of U.S. patent application Ser. No. 13/464,222, filed May 4, 2012, which is a continuation of U.S. patent application Ser. No. 12/186,264, filed Aug. 5, 2008, and claims the benefit of priority from U.S. Provisional Application No. 60/964,088, filed Aug. 8, 2007, all of which are incorporated by reference.

BACKGROUND OF THE INVENTION

1. Technical Field

This disclosure relates to data management, and more particularly to an automated interface that manages media.

2. Related Art

In an audio or video conference users connect to others through a data network. Each user broadcasts media streams to other users whose systems receive and render sound or images.

To maintain interactions, systems receive and render data from each user. As the number of users increase, the audio speaker or video display that renders the media may distort the output or lose the detail delivered by a data stream. In a video application, the limited display area of a monitor may distribute images in equal areas about a screen hiding the fine details of some transmitted images. In an audio system, sound may converge from all of the loud speakers of the system. The convergence may distort the audio or render the media unintelligible.

SUMMARY

A system allocates channel bandwidth based on the data received from a plurality of remote sources. A de-multiplexer/priority circuit separates two or more different data streams into their components parts. A stream modification driver modifies one or more characteristics of the data received from the de-multiplexer/priority circuit based on a priority assigned to the data by the de-multiplexer/priority circuit. The de-multiplexer/priority circuit determines the data transfer rates for each of the different data streams based on the assigned priority or priorities.

Other systems, methods, features, and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

An automated system improves the fidelity of audio, video, text, or data received from remote sources. Through a priority (or priorities) assigned by one or more metrics, the system optimally distributes a limited bandwidth among connecting nodes of a network. Signal characteristics that may include image size, position, crop margins, skew, brightness, and/or layer order (z-depth) of a video and/or the volume level, pan, equalization, reverberation of a signal may be modified according to the priority (or priorities). Priority may be assigned by a detection event (e.g., occurrence or magnitude of voice, motion, etc.), a manual event (e.g., a gesture detected by an input that captures and/or tracks images or on a single or multi-input touch sensitive screen), and/or an automated event (e.g., a facial recognition, a sound recognition, etc.).

Figure 1:
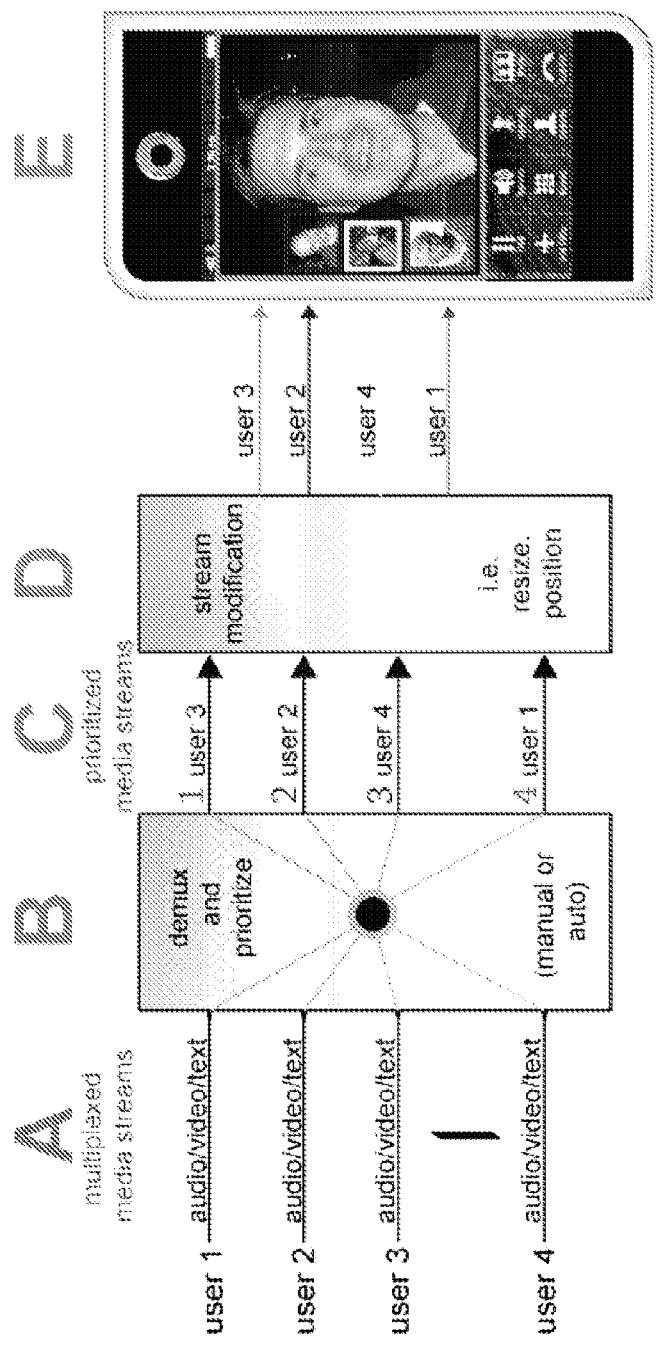
FIG. 1 is a logic diagram of a multi-user priority system.

FIG. 1 is a system diagram of a multi-user device. The interface logic allows users to send and receive information from remote sources across a network. The network may transfer data related to similar or different media or data elements. The media may comprise audio, video, text, and/or other data that are pushed from a source or pulled by a user device. The media may be received continuously or in discontinuous time periods. The nature of the media and rate of delivery may affect the frequency and priority (or priorities) in which the media or data is rendered.

In FIG. 1, a communication device receives one or more signals through multiple channels (shown in A). The signals may be a combination of media originating from a common source or from multiple sources. One or more remote concentrators may combine several different streams of data such as audio, video, text, and/or other data and transmit the different or segregated concentrations of data across a common or distributed communication lines. In FIG. 1, four separate channels deliver the multiplexed media to an inverse multiplexer or de-multiplexer and priority circuit or logic (de-multiplexer/priority circuit). The entire bandwidth at the client connection may be equally or unequally distributed before the media is processed by the de-multiplexer/priority circuit. Additionally, more or less media communication lines (telephone lines or communication channels) may be processed by the multi media device.

The de-multiplexer/priority circuit analyzes or processes each of the media streams before allocating bandwidth among the output user channels. After separating each media stream into its component parts, the de-multiplexer/priority circuit analyzes one or more metrics of the received media. Some systems detect voice (e.g., through a voice detector or voice detection process), video (e.g., through a video detector or video detection process), or noise (e.g., through a noise detector or a noise detection process); some systems use a manual determination; some systems apply automated systems or methods, and other systems use a combination embodied in logic, devices, or circuitry to assign priority (or priorities) to the user inputs or prioritized media streams. Bandwidth allocations are assigned before or after the channels are transmitted to a stream modification driver. In each channel, the audio/video/text/etc. may be re-combined into one (as shown) or more signals before they are transmitted to the stream modification driver through a unidirectional or bidirectional bus. The de-multiplexer/priority circuit and stream modification driver may be separate from or a unitary part of the multi media user device (e.g., end user media device).

Using the derived priority from the de-multiplexer/priority circuit, bandwidth is allocated. Bandwidth allocation may occur continuously during a user session or may lack a temporal relationship; it may occur asynchronously. Based on the priority, the demultiplexer/priority circuit may communicate with the originating source or a surrogate source (that may be linked to or in communication with an originating source) through a transceiver to assign data transfer rates to each input channel. In some systems the communication may comprise a request to reduce transfer rates.

In some systems, the cumulative data transfer rates of the separate channels may be limited to the bandwidth of the de-multiplexer/priority circuit interface. In other systems, a de-multiplexer/priority circuit may adjust the transmission speed or rendering rates through data selections, truncations, or buffering that may record audio, video, and/or messaging in a local memory (e.g., a flash memory, hard drive, digital media/video recorded memory, etc.) that may or may not be rendered to a user in session (at a user's direction or this may occur automatically). The local memory may comprise a memory module or one or more elements that may be contributed to a shared addressable memory space that interfaces one or more nodes in communication with the end user media device (e.g., client device or client media device). In some systems the total data transfer rates allocated to the channels may be fixed while communication connections are sustained or may vary during a user's session. A channel may be allocated a relatively low bandwidth when little or no information is received, such as when no activity or data is received or process. During that same session or period another channel may have increased activity or data transfer rates and may be allocated a relatively higher bandwidth through a flexible and/or dynamic adjustment.

In one multimedia session, each user may have a different bandwidth allocation (e.g., a static allocation or a dynamic that may change during a session such as a dynamic temporal allocation) based on the metrics analyzed by the client media device. Once allocated and processed by the de-multiplexer/priority circuit, the signals are transmitted to the stream modification driver that may resize, position, amplify, pan, and/or etc., the media before sending it to the end user media device that renders it. In FIG. 1, the stream modification driver may position the images of the users (shown by end user media device E).

The end user media device (E) may render the media in many forms. Calls may be received and made in many manners. The end user media device may convert voice, other sound signals and data into one or more forms that may be transmitted to one or more remote locations (e.g., teleconferencing) that receive and reconvert the content into an original or other perceptible forms through devices that translate the media from one perceptible form to another (e.g., a voice-to-text converter, text-to-voice converter, video-to-voice converter, etc.). A call may include a combination of video, audio, and/or text. In some systems, the diverse media may not be transmitted or stored in the end-user media device as separate files until the complete file is received. In these systems, the multimedia may be encoded in a single format that may be rendered in real time 'on-the-fly' even when the communication content is not completely received (e.g., downloaded).

Figure 2:
FIG. 2 is a visual display of circular frames.

The hardware or software of the end user media device may present the media through virtual frames shown in FIG. 2. Higher priority images or data may be rendered in larger diameter bubbles, circles, or spheres (e.g., geometric shapes). In some systems, the display may simulate physical motion by rendering images that "bounce" into each other. As the activity associated with an image increases audio volume may be adjusted and panned to identify the more active channels. A user may move image around through a wireless absolute or relative pointing method or device (sensed on a single or multi-touch sensitive screen or gesture sensitive input or screen). When images appear in moving frames, a gesture may be used to "flick" an image. It may send an image spinning about the display region. In some systems the acceleration, speed, and/or direction of the gesture may determine the acceleration, speed, and direction of the movement of the image. The movement may be rendered locally or may be disturbed to the local and the geographically separated remote users so that the users may view a customized display or share a common view.

Figure 3:
FIG. 3 is a visual display of a rotating cube.

FIG. 3 shows a three dimensional rotating virtual cube that may display media across the visual face(s) of an object. In this interface, higher priority or high bandwidth media (e.g., such as advertising) may rotate towards a user. When two users speak simultaneously or almost simultaneously, they may appear on an "edge" of the virtual cube facing the user. In some applications the two other faces of the virtual cube may separately render each video stream. When three users speak simultaneously or almost simultaneously, they may appear on separate "edges" of the virtual cube to from a corner. Image size, audio volume, textual size, color, font, and/or other characteristics may be adjusted to highlight one or more active or relatively more active channels. A user may navigate about the virtual cube through an absolute or relative input (e.g., through an absolute or relative pointing method or device), a gesture captured on a multi-touch or single touch screen or gesture capturing user interface, or by some other circuits, devices, or methods. An absolute pointing device or method may associate a user's selection or position to a position on a display. A relative pointing device or method may associate a user's or device's movement to an on-screen movement but not to a position.

Figure 4:
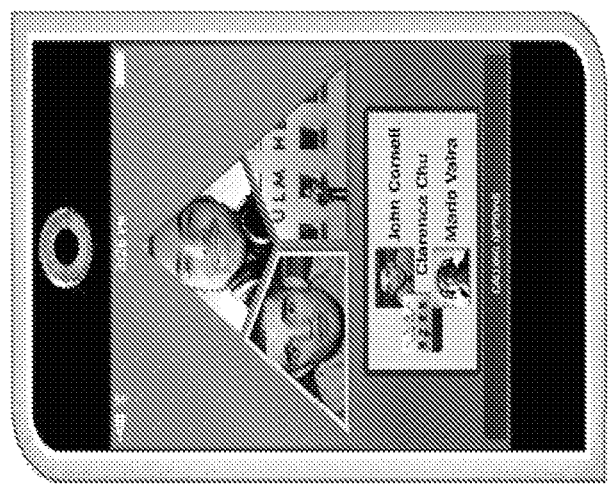
FIG. 4 is a visual display highlighting a geometric shape.

FIG. 4 shows a virtual geometric object. The media may be sectioned in geometric shapes. Higher priority media may be circumscribed with a highlight. In some systems higher bandwidth channels may be positioned near a prominent position of the geometric shape such as near the top of a pyramid, the top of a triangle, the center of a sphere or the center of a circle, for example, and may have a higher adjusted volume (or more media) delivered by a source closest to the end user. In FIGS. 2, 3, and 4, the images may be rendered in full screen by a video driver and the video may be selectable and modified in real time. The volume and data may also be adjusted to call out or highlight the active channel or speaker.

Figure 5:
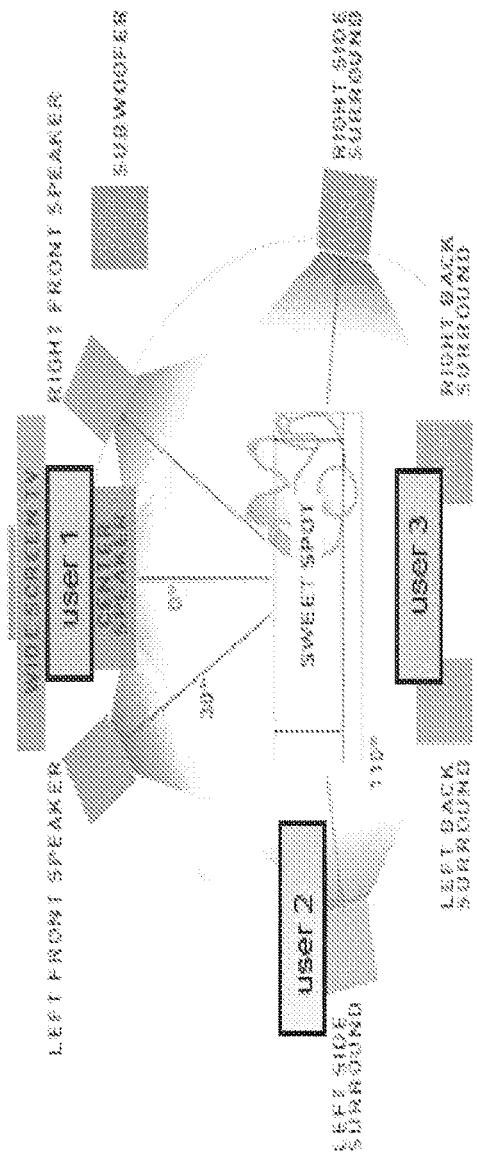
FIG. 5 is a spatial diagram of multiple audio streams.

Bandwidth allocation and priority may also be used in audio systems or social networks that receive several audio streams that are rendered into aural sound for each user. Multiple audio streams may be routed to different speakers ("panned") in a surround sound field as shown in FIG. 5 according to the priority (or priorities) assigned or relative bandwidth allocated by the de-multiplexer/priority circuit. If a user is speaking, an audio stream may be routed to a center channel of a system exclusively, for example, and may be amplified to reinforce their presence. Ancillary sources (e.g., other users' audio streams) may not be delivered through a direct communication path to the end user. Ancillary sound may include background noise, or may capture sporadic conversations. For example, acknowledgements from other sources expressed as a "ya" . . . "of course" . . . "okay" may be routed to rear side, or lower priority loud speakers that may not deliver audio directly to the end user. In some systems, such ancillary communication or noise may be attenuated. In some alternative systems noise removal circuitry or logic may process the information rendered by the end user media device or delivered by channels when a low signal-to-noise ratio is detected ("SNR"). In each of the systems or in alternative systems an automatic-gain-control ("AGC") may be applied to channels to bring each of the channels to a relatively consistent or different (but perceptible) call or volume level. In these systems, the noise removal circuitry or logic and/or automatic gain control may be a unitary part or separate from the end user media device.

Customized graphical images or skins may be disposed within, near, or behind the visual displays. A standard background, one or more advertising messages, or corporate skin may be displayed (e.g., scrolled). In some systems, the media may be positioned behind a more traditional display. In a "teen" mode, images such as head shots may be mapped onto circle, bubble, sphere, cube, or other objects that move around in front of, behind, or near a graphical image. The elements may interact (e.g., move, strike, collide with, dissolve, attach to, surround, etc.) with each other or may become animated in a game-like or interactive game-like manner. Members may be invited to join a "video/textual chat room." In a "family" mode, members may be invited into a common element such as an image of a "house." The skins may maintain one or more visual impression characteristics of the content provider, an advertiser, a source, or may identify the selected mode or function. The visual impression characteristics may comprise one or more color(s), font(s), styles (s), or symbol(s) that may be associated with or may differentiate a content provider, source, product, or user. A visual impression characteristic may be a distinctive characteristic by which a product, service, or response comes to be known, becomes associated with a source, or is well known (e.g., a trademark or trademark like).

Since the media streams sent between users may contain any type of media or data, the system may interface an audiovisual system or file that renders an accompaniment to a song that may be performed by singing or following the words on the video screen. One or multiple users may broadcast a data stream that includes audio, text (e.g., timed text, possibly embedded in a multi-track media container such as *.mp4), data and/or possibly video to all the other or selected end user transceivers in a session or a call. Each user or multiple users may assume the spotlight by performing the song which may be heard and seen by all or in some systems, by selected users in the session or call.

Some systems support separate sub-sessions within a user session or a multi-user videophone call. If a user wishes to speak privately to a number of other users, they may transmit a request to those users to "join a private room" through a transceiver coupled to the de-multiplexer/priority circuit. A user may request a private conversation through a graphical user interface. In one system, a user may select an object associated with a user through a gesture input, pointing device, and/or touch sensitive screen and may drag or move the objects to another object or location on the screen. A user may release the object (e.g., image) onto another object (e.g., an image or icon) that may appear as a door icon or another image. Such a movement may create a sub-group that would allow users to automatically invite others to join a call. If an invitee accepts the invitation, users may speak privately or share media (e.g., text, video, images, media conversions such as speech-to-text, etc.) with the invitee(s) through separate channel(s) or a call line "on the side" without disturbing (or releasing access to) the others that may continue the earlier session or call. The system may maintain multiple communication links, and some systems may automatically mute one or more audio or video output channels in response to a user's direction or through an activity detector or method when a side-bar connection occurs. Some systems may allocate bandwidth among sub-session participants as described herein. In alternative systems, the bandwidth allocation may occur through an aggregate of all if the active multi media calls or sessions that the end user media device supports.

Figure 6:
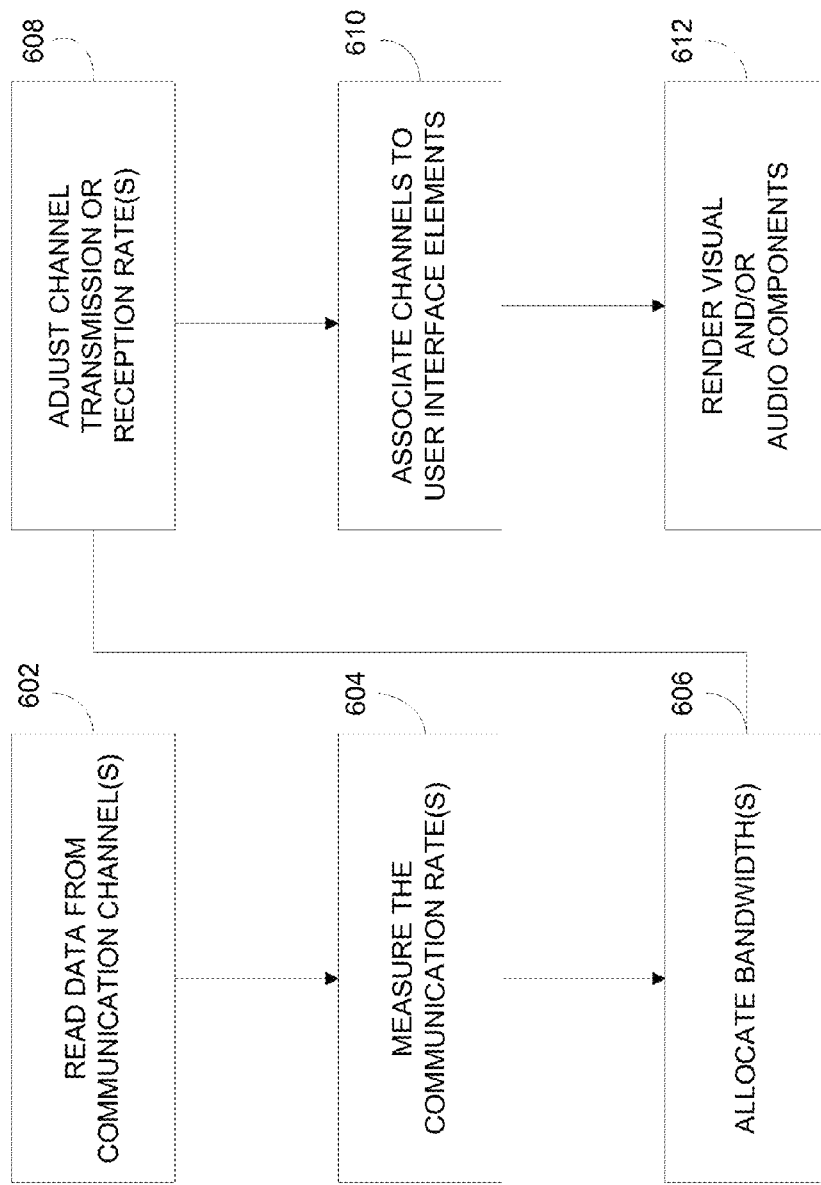
FIG. 6 is a bandwidth allocation process.

An adaptive bandwidth allocation may automatically adjust the transmission speed (e.g., bandwidth) or rending rates of the end user media device based on one or more metrics. Some processes have or provide the capability of increasing throughput in increments such as the process shown in FIG. 6. The process reads data at a node that interfaces one or more communication channels linked to the end user media device at 602. The communication rates of some or each of the communication channels may be estimated or measured. The speed at which information is received (or the amount), the content (voice, video, textual, or data content), signal quality, the magnitude, or one or more other criteria or metrics are processed to allocate transmission speeds or rendering rates at 606. As one or more of the criteria or metrics change an adaptive bandwidth or rendering adjustment may occur at 608. The channels and adjustments may be associated with user interface elements that may comprise images, real time processed and/or rendered video streams, pictures, photographs, animations, caricatures, avatars (of users, animals, objects, etc,) and/or static or animated objects at 610. Each user interface element may represent a static or dynamic identity element or object that may be rendered by an end user media device and shown on a display or transmitted through an audio output such as an audio speaker.

Figure 7:
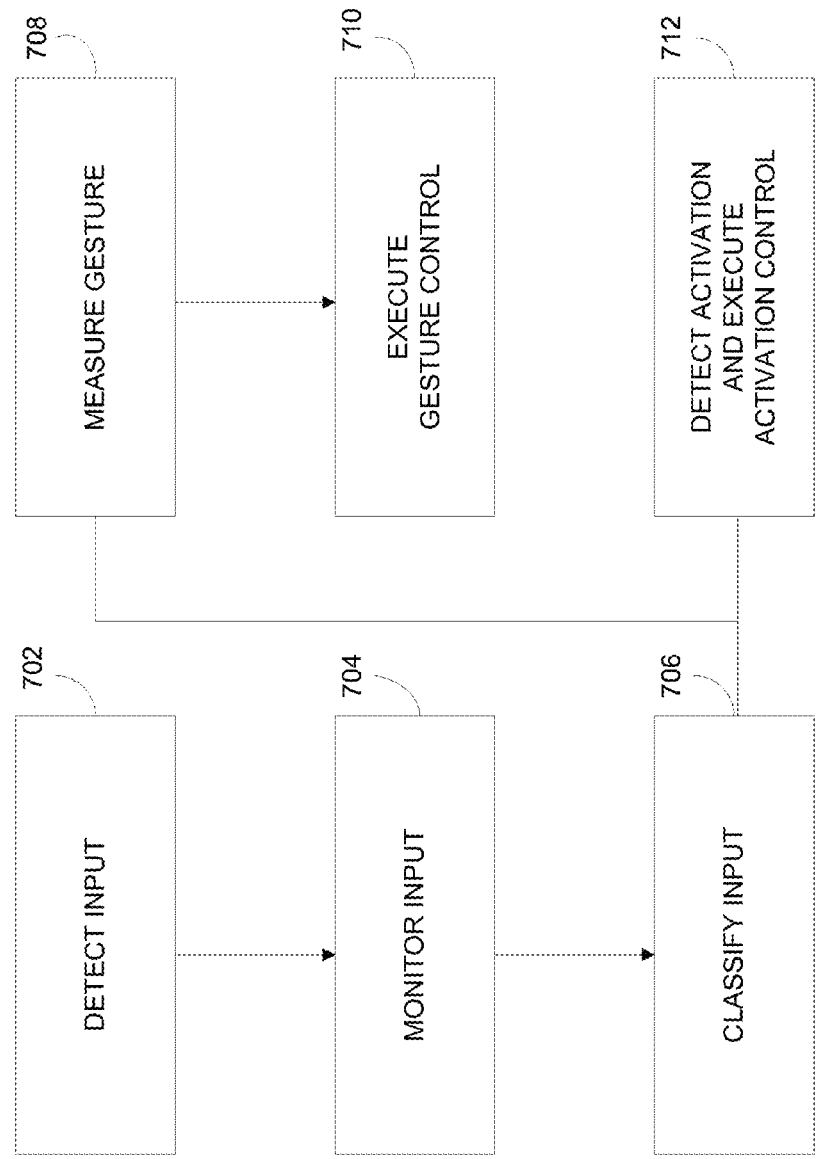
FIG. 7 a local multi-input user interface process.

A pressure and/or optical sensitive input (may include touch sensitive membranes that include pressure sensors and/or gesture sensitive inputs that capture images) in FIG. 7 may allow a user to enter multiple inputs through one or more nodes or touches. When a user makes a selection an input is detected at 702. Through a motion or one or more contacts (e.g., touches with an input) the process or a driver receives data from the user. The process or circuitry (e.g., an input/output controller) monitors the input that may comprise a single selection through a single input or one or more selections that may be made through a gesture at 704. As the input is tracked and classified at 704 and 706, the user may activate programs and select options resident to a memory module. If the user interactions are classified as a gesture (e.g., more than a single interaction with an input or an image) it may be compared to a set of objects that have meaning through a gesture recognizing device at 708. Based on the comparison, a computing device may execute the pre-coded objects (e.g., computer executable modules) generated by the recognizing device. When executed, the pre-coded objects may activate programs stored in a client-side or end user memory. If the user gestures are classified as an activation (e.g., a single user interaction), the user interaction may cause a processor (resident to the end user media device) to execute pre-coded objects that may activate a program stored in the client side memory.

Figure 8:
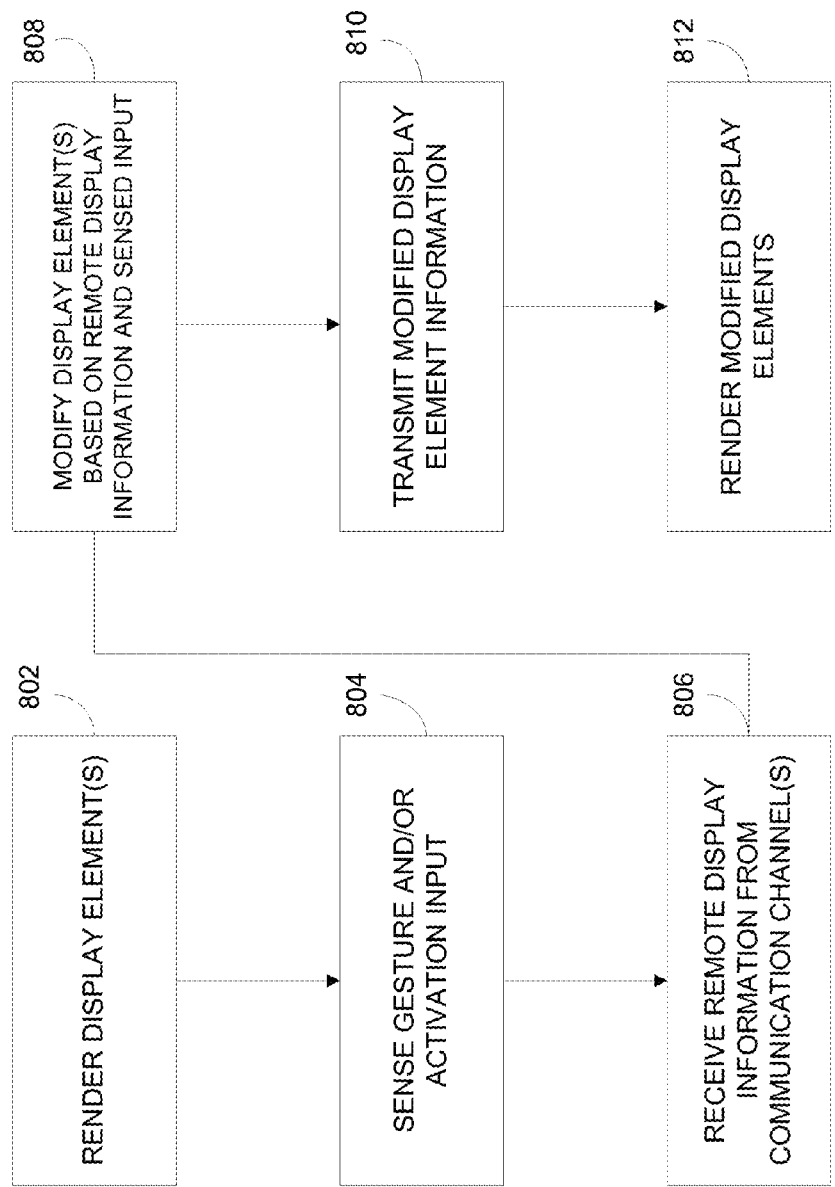
FIG. 8 a distributed multi-input user interface process.

The display elements may be modified or changed in real time based on substantially simultaneous input from a local user and a remote source. Visual display elements may be rendered on an input or display (e.g., single point or multi-point pressure or optical sensitive membrane) in FIG. 8 at 802. The display or a portion of it may be available or accessible to a single user or linked through a multi-user network to multiple geographically separated users. One or more gestures or activations may be received over or across a visual element such as an image of one or more users that may be linked to the end user media device at 804. The inputs may comprise a single interaction or multiple interactions that may occur simultaneously, substantially simultaneously, or may occur in series that may be sensed one after another in time. Remote input may also be received through a communication channel in unison with or at anytime during the process at 808.

Based on the local and/or remote input, display control codes may be transmitted to the display driver to modify or manipulate the appearance or movement of a video, an image, picture, animation, avatar, and/or element that may depict one or more user's identity (referred to as visual element(s)). In some systems the movement, changes, or manipulations may occur and/or correspond to the inertia, speed, and/or direction of the input (e.g., the gesture or activation). For example, a counterclockwise rotation may cause an image or object to rotate in a counterclockwise direction. In some processes, the rate and/or direction (e.g., drift) of the rotating image or object on the display may correspond to the rate and/or direction of the user's gesture. In some systems, the acoustical pitch of an input (e.g., a fundamental frequency of a person's voice) detected through an acoustical pitch detector may vary the horizontal and/or vertical movement (e.g., the angular movement) of one or more visual elements rendered through a pitch controller, driver, or processor. A pitch detection and tracking method, detector, driver or processor may track a source's acoustical pitch and tilt a visual element such as a three dimensional avatar's head forward and backward in relation to the detected acoustical pitch. The controller, driver, or processor may correlate an aural spectrum to a visual movement (referred to as a visual pitch control).

In some processes the changes, manipulations, and/or modifications may be shown on a single end user media device or shared with multiple users through a multiple user network at 810. When shared, the computer executable control codes may be transmitted to the other display drivers so each or some of the user's end user media devices may render the modified display elements at 812 (e.g., a common interactive display) in real time or in substantially real time.

Figure 9:
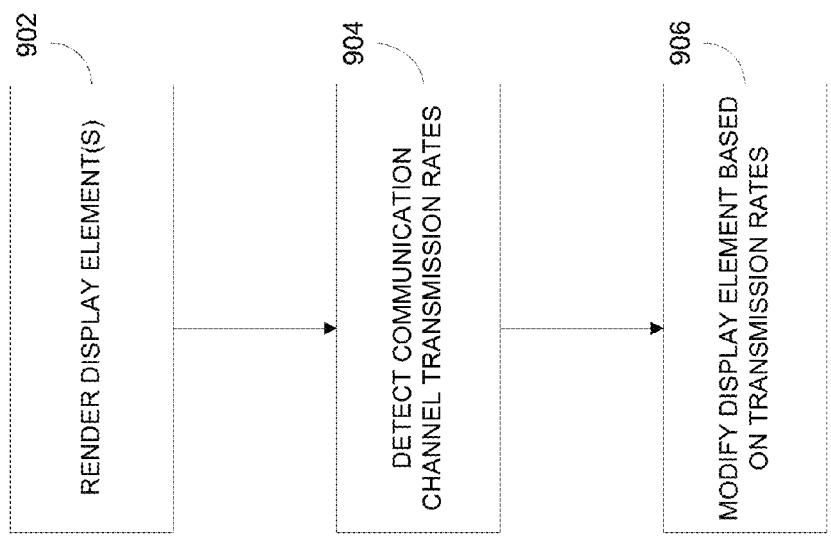
FIG. 9 is an automated user interface process.

The rate of change or an image or position of an image, picture, animation, avatar, and/or identity (that may participate in a video and/or audio conference) may depend on the dynamic or static allocated bandwidth. An input/output controller that may comprise a pressure and/or optical sensitive device or process (that may include touch sensitive membranes that may have pressure sensors and/or gesture sensitive inputs that capture images) may render display elements in FIG. 9 at 902. Based on the received communication channel transmission rates, a derived priority (or priorities) may allocate bandwidth between the participants of a call or session at 904. Based on the allocation, the rate at which the display elements change may correspond to the rate of change of the user's input and the assigned bandwidth allocation at 906. In some processes the rate of change of a display element (e.g., an identity element) may correspond exclusively to the assigned bandwidth or transmission rates. In some processes, the rates may be fixed or may be dynamic. In alternative processes, a processor executed tween may control changes of visual elements such as processes by which one visual element (e.g., an image) may change or gradually transform into another visual element. The process may create an illusion of a metamorphosis that may occur in a short period of time. In some uses, the processor executed tween may transform a static element into an animated element (e.g., gradually transform a static image into an image that appears to be moving or talking). When combined with a visual pitch control, the animated element may move in two (e.g., a two coordinate system), three (e.g., a three coordinate system), or four (e.g., a fourth coordinate system where one coordinate may comprise time) dimensions.

Figure 10:
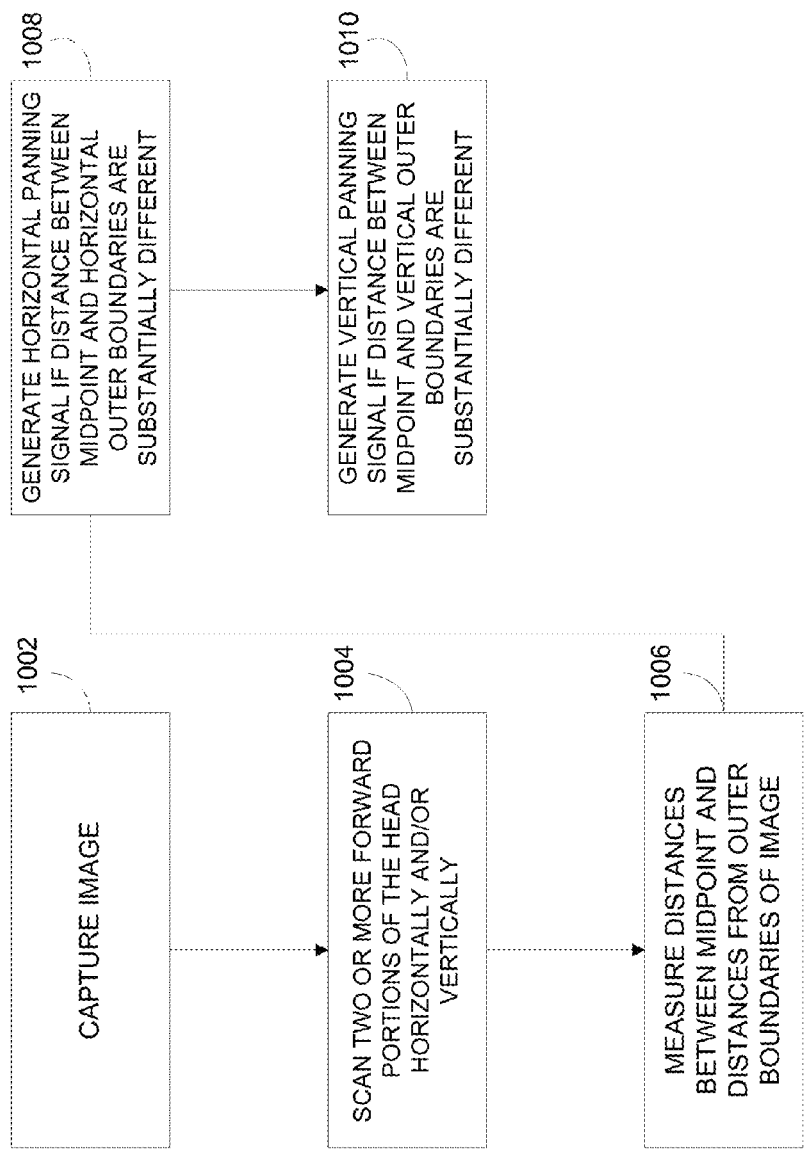
FIG. 10 is an automated panning process.

A display process that may automatically bring off screen extensions of an image into view may also be retained in a memory of the end user media device (e.g., media player). At 1002 the process of FIG. 10 may capture an image. A digital or video camera may store electronic images in the memory. When an image is not centered or miss positioned, the end user media device may process or scan the image or a portion of the image (a head in a photograph for example) at 1004. The measured distances between a reference point (e.g., a midpoint) and an outer boundary may be compared. Through a visible or transparent movable display window, the image or object may be repositioned automatically at 1008 and 1010. In some processes, the centered or repositioned object may maintain the same aspect ratio as the unmodified object. As the object is rescaled, an auto-sizing process may accept the image at one resolution and display the image at a different resolution. The object may be enlarged or reduced to fit an allocated space or position.

Figure 11:
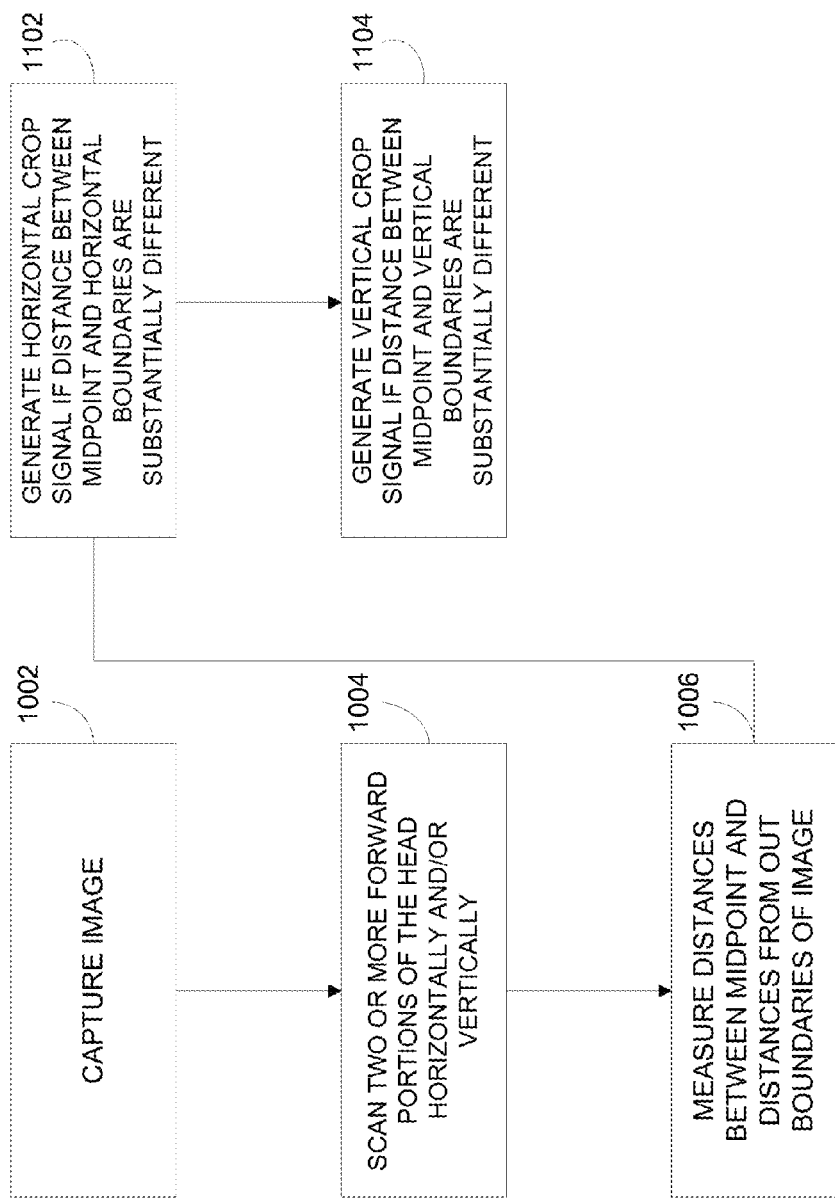
FIG. 11 is an automated cropping process.

Some processes may automatically remove the outer portions (or unwanted areas or irrelevant details) of an image to improve framing, accentuate subject matter, improve a composition and/or change the aspect ratios. In the automated process of FIG. 11, the end user media device may remove unwanted areas of an object in a horizontal and vertical plane. If unwanted areas are positioned near a left or right portion of an image or object, a horizontal crop signal is generated at 1102. If unwanted areas are positioned near an upper and/or lower portion of an image or object, a vertical crop signal is generated at 1104. The two dimensional cropping may occur substantially simultaneously to improve the placement, centering, or focus of an object. In some alternative processes, an object may be brought into focus by generating vignette signals in one or more dimensions (e.g., height, width, depth, etc.). Vignetting may reduce an object's (e.g., image) brightness or saturation at the object's periphery compared to the object's (or image) center.

Figure 12:
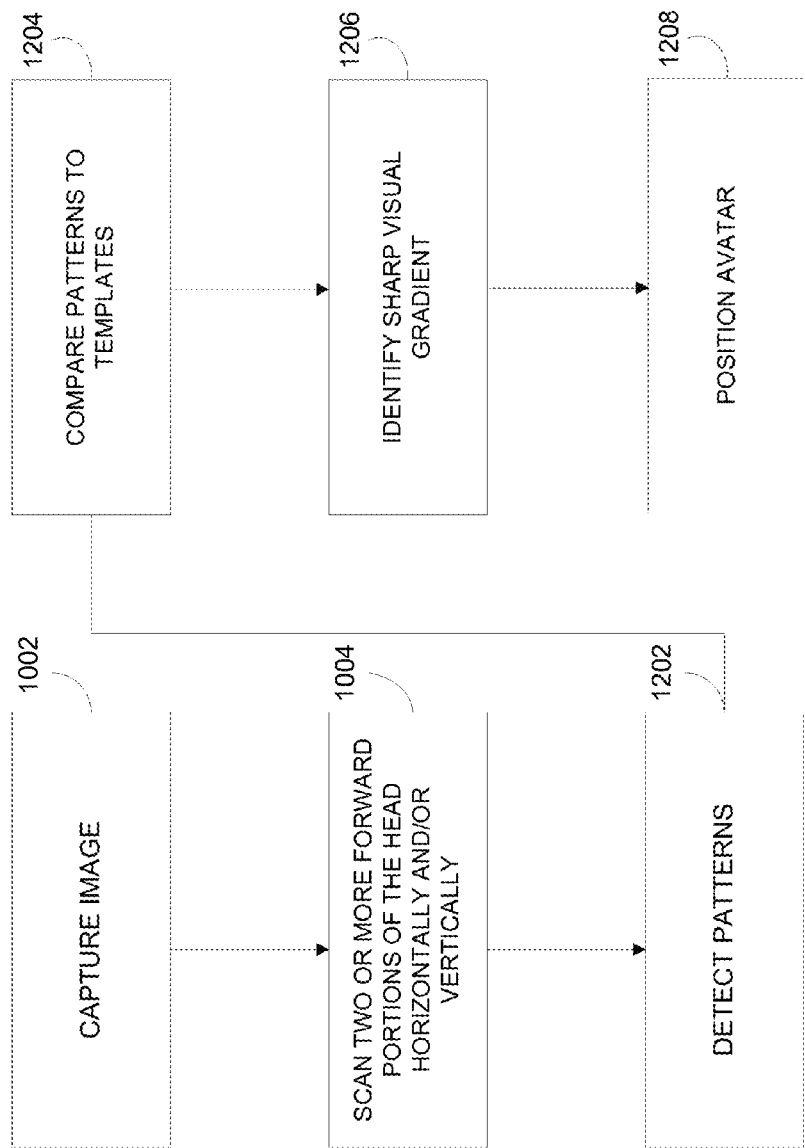
FIG. 12 is a process that integrates a virtual reality element with an optional image element.

In some processes objects or images may be generated or modified by placing or layering a graphical representation, animation, image, and/or object near or on another object. Following the image capture and processing of 1002-1004 (previously described), the process of FIG. 12 examines facial features by detecting patterns of dark and light at 1202. Once the end user media device has detected one or more patterns, template recognition methods that pattern match the detected patterns to stored sets of templates in the end user media device occur at 1204. Once matched, a position point may be identified. In some processes, a sharp gradient may identify a position point at 1206. An avatar, generic picture, animation, caricature, or other object may be positioned at 1206. The avatar may be automatically selected by the process. In alternative processes, the avatar may be chosen by a user.

Figure 13:
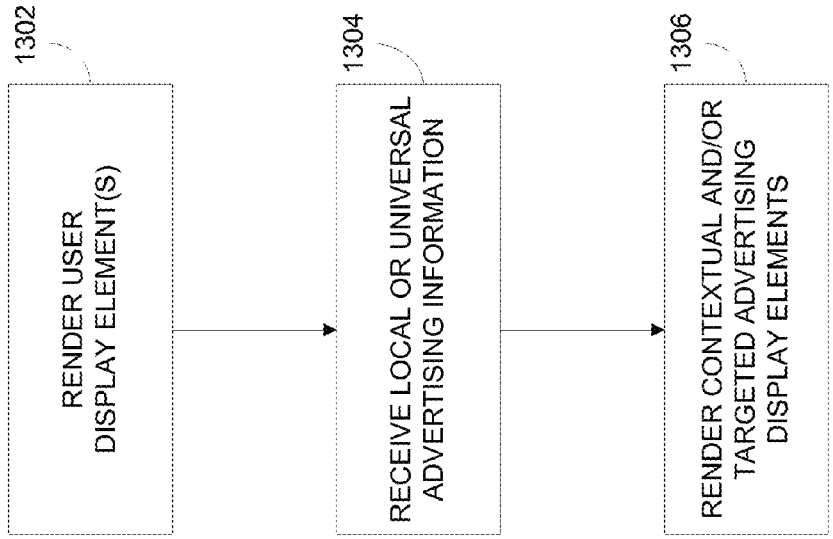
FIG. 13 is an information placement process.

In some processes the display elements may be shown with information that attracts one or more user's attention to a product, service, or business. The audio and/or visual messages may overlay or supplement virtual or interactive elements such as those shown in FIGS. 1-4 (FIG. 13 at 1302). The product, service, or business information may be identified by a user interface process (or user interface). The user interface process may identify a product that may be of interest through a contextual recognition (e.g., recognition of audio, visual, and/or textual content through an audio and/or visual recognition device) or by an association with a location. In some processes the local or remote contextual recognition may automatically recognize demographic elements or physical features (e.g., the gender, age, race, and physical features (glasses, beard, etc.) of a source and/or associate (e.g., one or more contacts that may be linked in a social network) to deliver a targeted message or marketing. The process may communicate with a remote advertising module that may retain files or stream media for distribution to mobile media clients. In response to a request (or on its own imitative, e.g. target marketing) the advertising module may transmit multimedia product, service, or business information to the end user media device. The end user media device may receive local or universal advertising information that may be retained in separate files or encoded with, or linked to objects such as one or more frames that may bound or outline the geographic elements at 1304. A computing device (within the end user media device) may execute an application that renders the contextual and/or targeted advertising at 1306. The advertising may be transmitted among the various geographically separated participants of a call or session. In alternative processes, separate advertising may be distributed to some or each of the participants. In some processes the customized distribution may be based on the content a user originates or transmits, a user's geographic location, a user's interactions with the conferencing media, the multi media the user selects, etc.

Figure 14:
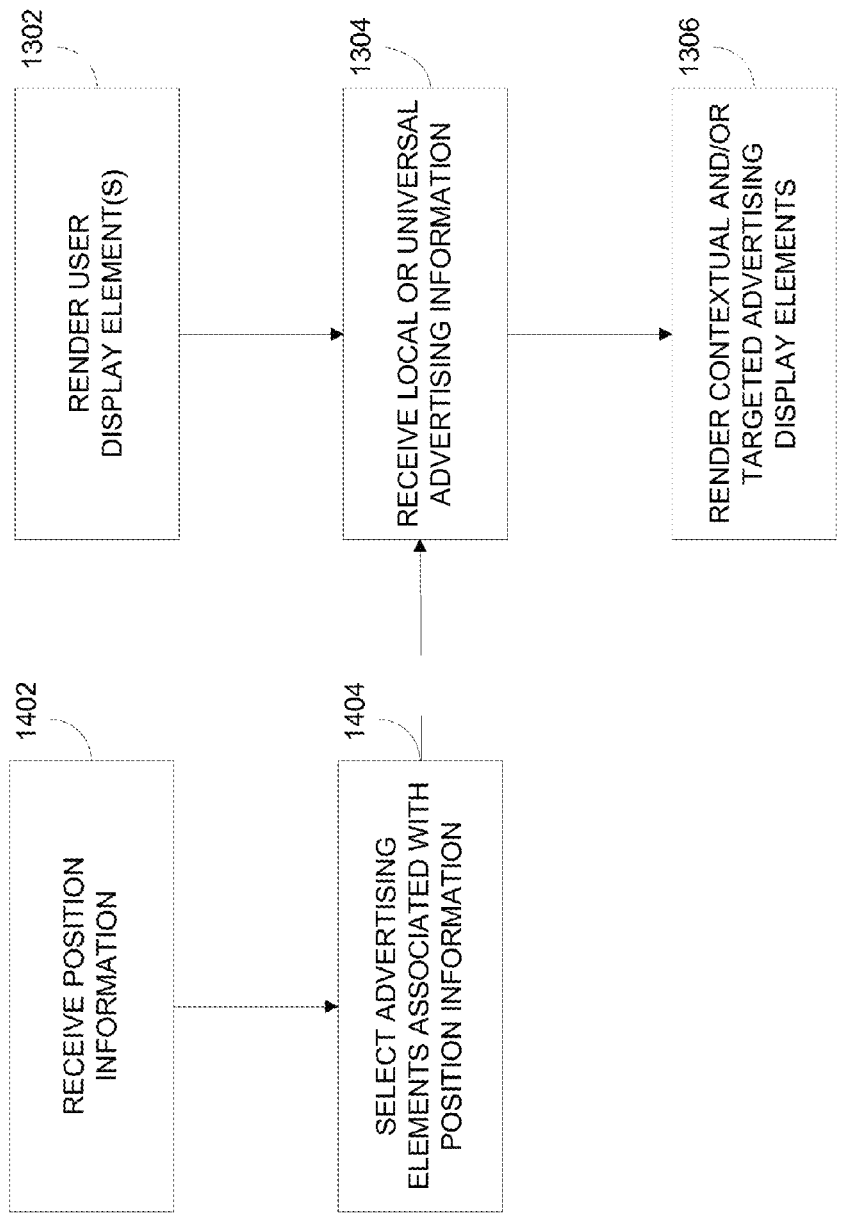
FIG. 14 is a second information placement process.

In FIG. 14 a second receiver (or transceiver in the end user media device) may track location through navigation signals that may comprise a GPS (global positioning system) protocol, a differential GPS protocol, a trilateraleralism of external encoded signals (e.g., may be in the radio frequency range), protocols that monitor continuously transmitted coded signals, or other locating protocols or systems at 1402. Based on the geographic location of one or more participant, the process may communicate with a remote advertising module that may create and maintain files or stream media for distribution to end user media devices. In response to a request (or on its own initiative) the advertising module may transmit multimedia product, service, or business information that may be processed as described at 1304 and 1306.

The systems, methods, and descriptions of FIGS. 1-14 may be encoded in a portable or static signal bearing medium, a computer readable medium, a computer executable module, or a computer readable storage medium such as a memory that may comprise unitary or separate logic, programmed within a device such as one or more integrated circuits, or processed by a controller or a computer. If the methods are performed by software, the software or logic may reside in a memory resident to or interfaced to one or more portable or static processors or controllers, a wireless communication interface, a wireless system, a powertrain controller, an entertainment and/or comfort controller of a vehicle or non-volatile or volatile memory remote from or resident to the end user or mobile media device. The memory may retain an ordered listing of executable instructions for implementing logical functions. A logical function may be implemented through or comprise digital circuitry, source code, analog circuitry, and/or through an analog source such as through an analog electrical, or audio signals. The software may be embodied in any computer-readable medium or signal-bearing medium, for use by, or in connection with an instruction executable system or apparatus resident to a vehicle or a hands-free or wireless communication system. Alternatively, the software may be embodied in media players (including portable media players) and/or recorders. Such a system may include a computer-based system, one two or more processor-containing system that includes an input and output interface that may communicate with an automotive or wireless communication bus through any hardwired or wireless communication protocol, combinations, or other hardwired or wireless communication protocols to a local or remote destination, server, or cluster.

A computer-readable medium, machine-readable medium, propagated-signal medium, and/or signal-bearing medium may comprise any medium that contains, stores, communicates, propagates, or transports software for use by or in connection with an instruction executable system, apparatus, or device. The machine-readable medium may selectively be, but not limited to, an electronic, magnetic, optical, electro-magnetic, infrared, or semiconductor system, apparatus, device, or propagation medium. A non-exhaustive list of examples of a machine-readable medium would include: an electrical or tangible (e.g., physical) connection having one or more links, a portable magnetic or optical disk, a volatile memory such as a Random Access Memory "RAM" (electronic), a Read-Only Memory "ROM," an Erasable Programmable Read-Only Memory (EPROM or Flash memory), or an optical fiber. A machine-readable medium may also include a tangible medium upon which software may be electronically stored as an image or in another format (e.g., through an optical scan), then compiled by a controller, and/or interpreted or otherwise processed. The processed medium may then be stored in a local or remote computer and/or a machine memory.

Each of the systems described above may improve the quality of audio, video, text, and/or data received from remote sources. By assigning a priority or priorities based on one or more metrics, the system (e.g., a mobile or portable system) optimally distributes a limited bandwidth among connecting nodes of a network or within the processing environment of the end user media device. Signal characteristics that may include image size, position, crop margins, skew, brightness, and/or layer order (z-depth) of a video or the volume level, pan, equalization, reverberation of a signal, etc. may be modified by an assigned priority within or separate from the end-user or rendering device. One or more priorities may be assigned by an event such as a detection event (e.g., voice, motion, etc.), a manual event (e.g., a gesture on a touch screen), and/or an automated event (e.g., facial recognition, sound recognition, etc.).

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A computer implemented method that facilitates a user's interaction with a communication device having a display comprising a gesture sensitive screen or a touch sensitive screen comprising:

detecting a contact with the gesture sensitive screen or the touch sensitive screen when the communication device is processing a multi-user call with a plurality of participants in a first user session of the multi-user call;

transitioning the communication device to a private conversation state and creating a private sub-session of the multi-user call when the detected contact corresponds to a predefined gesture;

where the predefined gesture comprises moving at least a first image toward a second image on the gesture sensitive screen or the touch sensitive screen in accordance with the contact, where the at least first image comprises a graphical user interface object with which a user interacts in order select at least one participant of the multi-user call for the private sub-session, and where the user is allowed to move multiple images toward the second image to select multiple participants of the multi-user call for the private sub-session;

automatically inviting the at least one selected participant to join the private sub-session of the multi-user call; and adding at least one invited participant of the multi-user call to the private sub-session, while the first user session continues.

2. The computer implemented method of claim 1 where the predefined gesture allows the participants of the private sub-session to speak privately.

3. The computer implemented method of claim 1 where the predefined gesture allows the participants of the private sub-session to share text, video, and a plurality of images.

4. The computer implemented method of claim 1 where the communication device comprises a portable electronic device.

5. A computer implemented method that facilitates a user's interaction with a communication device having a display comprising a gesture sensitive screen or a touch sensitive screen comprising:

detecting a contact with the gesture sensitive screen or the touch sensitive screen when the communication device is processing a multi-user call; and transitioning the communication device to a private conversation state if the detected contact corresponds to a predefined gesture;

where the predefined gesture comprises moving a first image toward a second image on the gesture sensitive screen or the touch sensitive screen in accordance with the contact, where the first image comprises a graphical user interface object with which a user interacts in order to set up a private conversation with selected participants of the multi-user call without releasing access to other participants that continue in the multi-user call.

6. The computer implemented method of claim 5 where the predefined gesture allows the selected participants to speak privately.

7. The computer implemented method of claim 5 where the predefined gesture allows the selected participants to share text, video, and a plurality of images.

8. The computer implemented method of claim 5 where the communication device comprises a portable electronic device.

9. A system that facilitates a user's interaction with a communication device having a display comprising a gesture sensitive screen or a touch sensitive screen comprising, wherein the system:

detects a contact with the gesture sensitive screen or the touch sensitive screen when the communication device is processing a multi-user call; and transitions the communication device to a private conversation state if the detected contact corresponds to a predefined gesture;

where the predefined gesture comprises moving a first image toward a second image on the gesture sensitive screen or the touch sensitive screen in accordance with the contact, where the first image comprises a graphical user interface object with which a user interacts in order to set up a private conversation with selected participants of the multi-user call without releasing access to other participants that continue in the multi-user call.

10. The system of claim 9 where the predefined gesture allows the selected participants to speak privately.

11. The system of claim 9 where the predefined gesture allows the selected participants to share text, video, and a plurality of images.

12. The system of claim 9 where the communication device comprises a portable electronic device.

* * * * *

UNITED STATES PATENT AND TRADEMARK OFFICE
CERTIFICATE OF CORRECTION

PATENT NO.        : 9,189,153 B2                           Page 1 of 1
APPLICATION NO.   : 14/286322
DATED             : November 17, 2015
INVENTOR(S)       : Phillip A. Hetherington et al.

It is certified that error appears in the above-identified patent and that said Letters Patent is hereby corrected as shown below:

In the Claims

In column 11, claim 1, line 10, after "acts in order" insert --to--.

Signed and Sealed this
Fifth Day of April, 2016

Michelle K. Lee
*Director of the United States Patent and Trademark Office*